Figure 1:
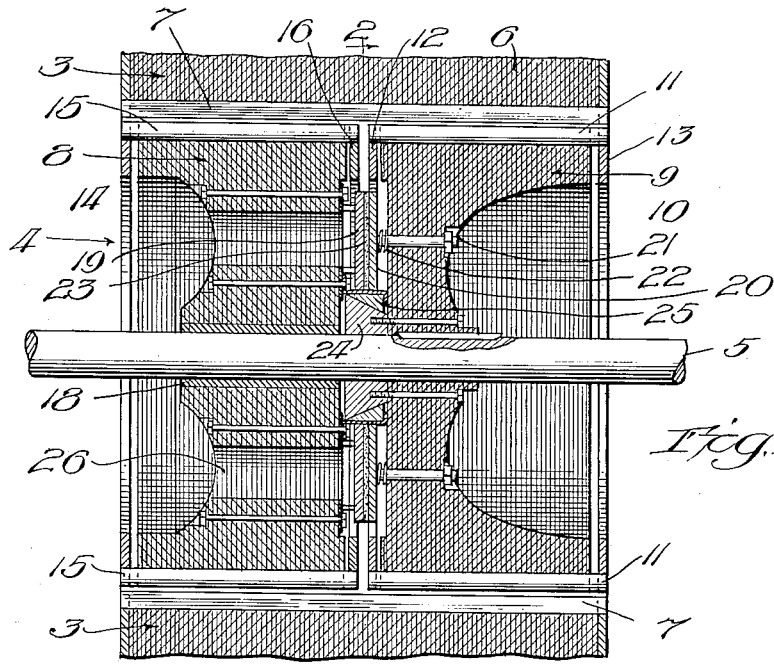

Sept. 9, 1924.

J. B. HAWLEY, JR

INDUCTION MOTOR AND THE LIKE

Filed March 14, 1923

1,508,100

Inventor:
John B. Hawley, Jr.
by Dannery & Dannery
Attys

Patented Sept. 9, 1924.

1,508,100

UNITED STATES PATENT OFFICE.

JOHN B. HAWLEY, JR., OF COLORADO SPRINGS, COLORADO.

INDUCTION MOTOR AND THE LIKE.

Application filed March 14, 1923. Serial No. 624,941.

*To all whom it may concern:*

Be it known that I, JOHN B. HAWLEY, Jr., a citizen of the United States, residing at Colorado Springs, in the county of El Paso and State of Colorado, have invented certain new and useful Improvements in Induction Motors and the like, of which the following is a specification.

This invention has to do with certain improvements in the construction and operation of induction motors and the like. More particularly the invention has to do with certain improvements in the construction of the rotors for these machines.

The main object of the invention is to improve the construction of the rotor in such a manner as to make it possible to greatly improve the operation of the same during starting under load.

In connection with the foregoing, it is noted that certain forms of induction motor develop their best torque after the rotor has been brought into motion, and, in fact, the curve of torque as plotted against speed will usually show a maximum amount of torque developed at a speed considerably above standstill. The shape of this curve will depend largely upon the resistance of the rotor winding as compared to its inductance, and is also largely affected by the reluctance of the magnetic circuit.

On account of the foregoing factors, various expedients have been adopted with the object of making it possible to increase the starting torque. Among these expedients are included the use of wound rotors together with outside resistances, which can be cut out as the speed increases until finally the rotor operates with its winding short circuited.

The main object of the present invention is to make provision for materially improving the starting conditions of the machine, so that it can be started up under load to the best advantage without the need of using any outside controllers such as resistances, etc.

In connection with the foregoing, one feature of the invention relates to the provision of a construction whereby the rotor or a section thereof is allowed to slip with respect to the load or with respect to the remaining portions of the rotor, so that it can quickly attain that speed at which it will develop its best torque. In this way, this portion of the rotor is allowed to operate to the best advantage for the development of heavy torque to start the load and without the need of using special outside devices.

In connection with the foregoing, I will state that in a more detailed consideration of the invention, it consists in the provision of a rotor made of two or more parts one of which is connected to the shaft or the load, and the other parts of which rotor are permitted to slip with respect to the first mentioned part during the starting operation so as to run ahead of the load at this time, together with suitable friction devices connecting the parts together, so that as soon as the load has been started and brought up to a certain speed, the slippage will cease and all portions of the rotor will operate to drive the load without slippage.

Other objects and uses of the invention will appear from a detailed description of the same, which consists in the features of construction and combinations of parts hereinafter described and claimed.

Figure 2:
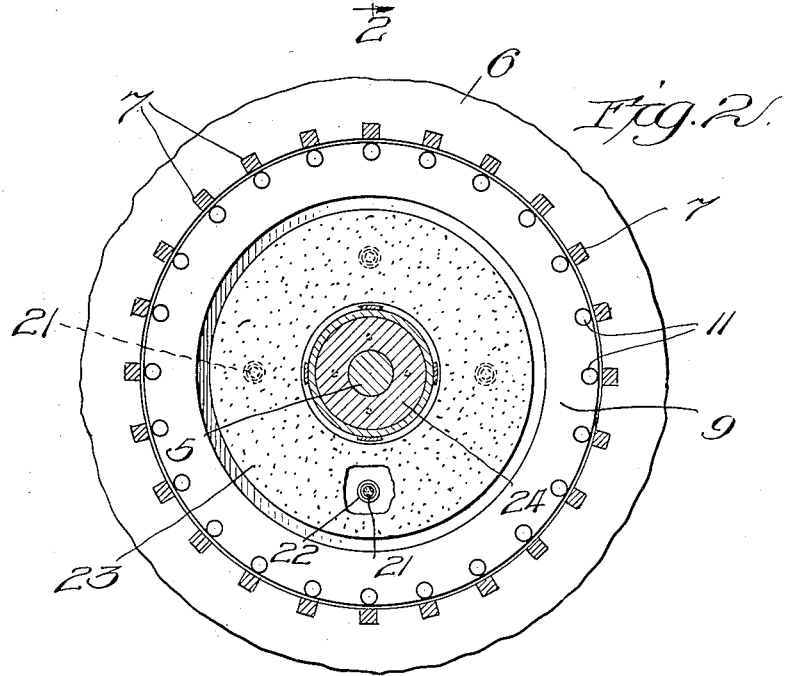

In the drawings:

Figure 1 shows a longitudinal section through an induction motor embodying the features of the present invention, the outside portions of the stator being broken away so as to reduce the size of the figure; and Fig. 2 shows a section taken on the line 2—2 of Fig.1, looking in the direction of the arrows.

In the arrangement illustrated in the drawings, I have shown the stator 3 as being placed outside of the rotor 4, so that the rotor operates inside of the stator. I have also shown the rotor as being mounted upon the driving shaft 5.

The stator is illustrated as being built up from laminations 6 into which are placed the winding 7. I will not in this application concern myself particularly about the form or arrangement of either the stator field or its winding, since manifestly, any suitable arrangement may be used which will result in the production of a rotating field to operate on the rotor. Ordinarily, this rotating field will be produced by a polyphase winding, but in some cases it may be generated by a single phase winding with any of the well known expedients.

The rotor 4 includes the sections 8 and 9. These sections are both located in position to be influenced by the rotating field of the stator, and both of the rotor sections are preferably placed concentrically with respect to the shaft 5.

The rotor section 9 is built up from laminations 10 and is keyed or otherwise rigidly secured to the shaft 5 so as to directly drive the same. Furthermore, the rotor section 9 is provided with a squirrel cage winding including the bars 11 and the end connectors or short circuiting rings 12 and 13.

The rotor section 8 includes the laminations 14 within which is placed a winding including the bars 15 together with the short circuiting end rings 16 and 17.

The rotor section 8 is rotatably mounted upon the shaft 5 as by the use of a quill or sleeve 18. I have, however, provided means for effecting a friction drive from the rotor section 8 to the shaft 5 under sufficient friction to allow slippage to take place during the starting operation, but to prevent slippage after the load has been substantially brought up to speed at which time the torque is normal.

The particular friction connection illustrated includes a circular plate 19 connected to the inner face of the rotor section 8, and another circular plate 20 connected to the inner face of the rotor section 9. The plate 20 is adjusted back and forth with respect to the rotor section 9 by reason of a series of studs 21 having end stops to limit their movement, in conjunction with springs 22 which exert the desired amount of pressure. A facing 23 can be placed on one of the rings 19 or 20 so as to develop the desired friction and withstand the wear due to relative movement.

I have also provided means for holding the two rotor sections in the proper relative positions on the shaft 5. This means includes a pair of tapered cone blocks or the like 24 and 25 connected to the two rotor sections and facing each other in such a manner as to prevent the rotor sections from being drawn apart. During the slippage a certain amount of friction will be generated between the sections 24 and 25 which will still further assist the starting action.

If desired suitable ventilating openings 26 may be formed through the core of the rotor section 8 so as to facilitate cooling of the friction surfaces in order to prevent overheating during the starting operation.

It will be understood that the relative slippage which should be allowed to take place as between the two rotor sections will depend largely upon the characteristics and design of the machine. Consequently, I do not herein specify any particular amount of frictional engagement, nor do I specify any particular speed at which the two rotor sections should come into locked condition, since these factors will all depend upon the design and arrangement of the particular machine in question.

Therefore, while I have herein shown and described only a single embodiment of the features of my present invention, still I do not limit myself to the same except as I may do so in the claims.

I claim:

1. In an induction motor, the combination with a stator adapted to generate a rotating magnetic field, of a shaft extending longitudinally therethrough, a squirrel cage rotor section secured to said shaft and located within the stator and subject to the magnetic influence thereof, another squirrel cage rotor rotatably mounted on the shaft and within the stator and subject to the magnetic influence thereof, and a friction connection between the two rotor sections permitting the second mentioned rotor section to turn with respect to the first mentioned rotor section when developing more than normal full load torque, and preventing such turning when developing not more than normal full load torque, substantially as described.

2. In an induction motor, the combination with a stator adapted to generate a rotating magnetic field, of a shaft extending longitudinally therethrough, two independent squirrel cage rotor sections mounted on the shaft and within the stator and subject to the magnetic influence of the stator, a rigid driving connection from one of said rotor sections to the shaft, and a non-rigid driving connection between the other rotor section and the shaft permitting said rotor section to turn with respect to the shaft when subjected to more than normal full load torque and preventing such turning when said rotor section is not subjected to more than normal full load torque, substantially as described.

3. In an induction motor, the combination with a stator adapted to generate a rotating magnetic field, of a pair of rotor sections subject to the influence of said rotating magnetic field, a driven element, a normal driving connection from one rotor element to the driven element, and a driving connection between the other rotor element and the driven element permitting said rotor element to turn with respect to the driven element when subjected to more than normal full load torque and preventing such turning when not subjected to more than normal full load torque, substantially as described.

4. In an induction motor, the combination with a stator adapted to generate a rotating magnetic field, of a driven element, a pair of rotor sections mounted in position to be influenced by said field, a driving connection from one rotor section to the driven element, a friction clutch connection between the two rotor sections, and a passage extending through one of the rotor sections permitting circulation of air therethrough to the friction clutch connection for cooling purposes, substantially as described.

JOHN B. HAWLEY, JR.